United States Patent [19]
Wilson et al.

[11] 3,986,947
[45] Oct. 19, 1976

[54] CATALYTIC REFORMING WITH A CATALYST COMPRISING A NOBLE METAL DEPOSITED ON SILICA DISPERSED IN AN ALUMINA MATRIX

[75] Inventors: Raymond F. Wilson; Li C. Mih, both of Wappingers Falls; John T. Brandenburg, Hopewell Junction; Reese A. Peck, Fishkill, all of N.Y.

[73] Assignee: Texaco Inc., New York, N.Y.

[22] Filed: June 10, 1974

[21] Appl. No.: 477,714

[52] U.S. Cl. .............................. 208/138; 252/455 R
[51] Int. Cl.² ........................................ C10G 35/08
[58] Field of Search ....................... 208/138, 135; 252/455 R

[56] References Cited
UNITED STATES PATENTS

| | | |
|---|---|---|
| 2,861,958 | 11/1958 | Barrett ............................ 252/455 |
| 2,899,382 | 8/1959 | Myers ............................ 208/138 |
| 2,976,332 | 3/1961 | Lehm et al. ..................... 208/138 |
| 3,434,960 | 3/1969 | Jacobson et al. ................ 208/138 |
| 3,679,578 | 7/1972 | Dalson ........................... 208/138 |

*Primary Examiner*—Delbert E. Gantz
*Assistant Examiner*—James W. Hellwege
*Attorney, Agent, or Firm*—T. H. Whaley; C. G. Ries; George J. Darsa

[57] ABSTRACT

A process for increasing the octane number of a paraffinic gasoline blending component comprises a reforming operation in which the component is contacted with hydrogen in the presence of a novel catalyst prepared by depositing a noble metal on silica gel and then dispersing said silica gel in an alumina gel matrix.

22 Claims, No Drawings

CATALYTIC REFORMING WITH A CATALYST COMPRISING A NOBLE METAL DEPOSITED ON SILICA DISPERSED IN AN ALUMINA MATRIX

BACKGROUND OF THE INVENTION

Reforming operations, where hydrocarbon fractions such as naphthas, raffinates and condensates, are treated to improve octane numbers are well known in the petroleum processng art. One of the principal results of reforming operations is the raising of octane numbers, particularly for use in lead free gasolines. The hydrocarbon fractions which are improved by the reforming operation are composed predominantly of normal and slightly branched paraffinic hydrocarbons and naphthenic hydrocarbons together with small amounts of aromatic hydrocarbons. During reforming, a multitude of reactions take place, including isomerization, aromatization, dehydrogenation, cyclization, etc., to yield a product having an increased content of aromatics and highly branched paraffins. Thus, in the reforming operation, it is desired to dehydrogenate the naphthenic hydrocarbons to produce aromatics, to cyclize the straight chain paraffinic hydrocarbons to form aromatics, and to isomerize the normal and slightly branched paraffins to yield highly branched chain paraffins. Additionally, under the appropriate circumstances, it is also desired to effect a controlled type of cracking which is both selective in quality and quantity; i.e., the cracked parafinic products desirably have six or more carbon atoms.

Normal and slightly branched chain paraffinic hydrocarbons of the type contained in reforming feedstock fractions have relatively low octane ratings. Highly branched chain paraffinic hydrocarbons, on the other hand, are characterized by high octane ratings. Thus, one objective of the reforming operation is to effect isomerization of the normal and slightly branched chain paraffins to more highly branched chain paraffins. Also, since aromatic hydrocarbons have much higher octane ratings than naphthenic hydrocarbons, it is also an objective of reforming simultaneously to produce aromatics in good yield. The production of aromatic hydrocarbons during reforming is effected by dehydrogenation of the naphthenic hydrocarbons and dehydrocyclization of the paraffinic hydrocarbons. Aromatic hydrocarbons are also produced by isomerization of alkyl cyclopentanes to cyclohexanes, which thereafter undergo dehydrogenation to form the desired aromatics. The convenient measure of the effectiveness of a reforming operation is based on the conversion of pentanes to cyclohexanes and aromatics; it is desired that the reformed hydrocarbon fraction be obtained in high depentanized yields.

Certain hydrocarbon fractions which fall within the boiling point range for gasoline blending components are composed principally of normal and slightly branched chain paraffins. These paraffinic stocks are very low in octane number and therefore, unless they are subjected to a reforming operation, they are not suitable for inclusion in lead-free gasolines. Reforming of these blending components, however, has been somewhat less than satisfactory, owing principally to undesired cracking reactions which occur in conventional reforming operations. This cracking, which produces butanes and lighter hydrocarbons, results in a significant loss of gasoline product.

It is therefore a principal object of this invention to develop a method for reforming paraffinic gasoline blending components in order to increase their octane number.

It is another object of this invention to develop a method for reforming these gasoline blending components without encountering a substantial loss in product volume as a result of conversions to butanes and lighter hydrocarbons.

A further object of this invention is to develop an effective catalyst for the upgrading of highly paraffinic and cycloparaffinic gasoline blending components.

Other objects and advantages will become apparent from the following disclosure.

SUMMARY OF THE INVENTION

According to this invention, a novel catalyst is provided for reforming operations which permits one to increase the octane number of a paraffinic gasoline blending component without causing significant amounts of undesired cracking to lower boiling compounds. The catalyst is a composite prepared by depositing a noble metal on silica gel and dispersing said silica gel in an alumina gel matrix. The noble metal content of the catalyst ranges from about 0.01 to 1.0 wt.%, the alumina content ranges from about 5 to 30 wt.%, and the remainder is silica. In addition to the noble metal, rhenium may optionally be included as a catalyst component, in amounts similar to those of the noble metal.

THE PRIOR ART

Reforming catalysts comprising noble metals, such as platinum and palladium, deposited on alumina gel or silica-alumina cogel matrices have long been known and many refinements thereon have been made during the past two decades. However, despite the many and varied methods of preparing platinum or silica-alumina catalysts, the deposition of platinum on silica gel base alone, thereby "fixing" the noble metal in the silica, and the subsequent dispersal into an alumina gel matrix has not heretofore been described.

U.S. Pat. No. 2,861,958, issued to Barrett, discloses a reforming catalyst comprising platinum dispersed on silica-alumina. The catalyst is prepared by simultaneously depositing on a silica gel base a platinum compound and a small amount of alumina. The platinum and the alumina may be deposited by impregnating the silica gel with aluminum chloroplatinate or, alternatively, a platinum compound and alumina may be deposited individually, but simultaneously. Included therein, for purposes of comparison is a series of catalysts consisting of silica gel impregnated with platinum, but with no additional treatment. These platinum impregnated silica catalysts were shown to be quite unsatisfactory for use in reforming operations.

U.S. Pat. No. 3,398,084, issued to Holmes et al, is concerned with various hydrocarbon conversion reactions, including reforming with a platinum catalyst. A Group IV metal oxide, such as silica, may be impregnated with a "catalyst component" and subsequently treated with a Group III metal salt, such as an aluminum salt. The "catalyst component" in the disclosed reforming process is a platinum group metal. The aluminum-containing compound is an aluminum metal salt, such as aluminum sulfate. There is no disclosure of dispersing the Group IV oxide impregnated with the "catalyst component" into an alumina gel.

DETAILED DISCLOSURE OF THE INVENTION

The feedstock for the process of this invention is typically a paraffin-containing hydrocarbon fraction boiling in the gasoline boiling range and characterized by having a low octane number. Suitable feedstocks include heavy straight run naphthas, light straight run naphthas and raffinates.

The catalyst of this invention is composed of a noble metal deposited or impregnated in silica, which is distributed in an alumina matrix. It is prepared by a new process comprising the deposition or impregnation of the silica gel with the noble metal and the subsequent dispersal of the impregnated silica gel in the alumina gel matrix. Said catalyst is a composite, rather than a physical mixture, and the interface - which is believed to be silica-alumina - is an important component thereof. The noble metal content of the composite catalyst can range from about 0.01 to 1.0 wt.%, preferably from 0.02 to 0.7 wt.%. The alumina component can range from about 5 to 30 wt.%, preferably from 5 to 15 wt.%. The remainder of the catalyst composition is silica.

The silica gel used in the preparation of the catalyst of this invention may be prepared by methods well known in the art. These gels possess high surface areas, ranging from about 100 to 1,000 m$^2$/gm., preferably, from 200 to 800 m$^2$/gm. The high surface area permits a more even distribution of the noble metal in the ultimate composite catalyst product. Highly preferred silica gels are acid leached silica where impurities such as iron are present in amounts below about 0.02 wt.% and preferably below 0.005 wt.%.

The noble metal dispersed in the silica gel is preferably platinum or palladium, most preferably platinum. Deposition of the noble metal on the silica gel is most conveniently accomplished by impregnating the silica with a solution of the metal. Suitable noble metal compounds include platinum chloride, chloroplatinic acid, ammonium chloroplatinate, dinitrodiamino platinum, palladium chloride, chloropalladic acid, etc. When platinum is employed as the noble metal, the preferred platinum-containing compound is chloroplatinic acid.

In addition to the noble metal, rhenium may also be present as a catalyst component. When so employed, the amount of rhenium can range up to about 1.0 wt.%, preferably up to 0.7 wt.% of the composite catalyst.

The alumina component of the composite catalyst is present as $\eta$ or $\gamma$-alumina. For economic reasons, $\gamma$-alumina is preferred. In addition to providing an interface with the silica, as noted above, the alumina component also acts as a binder to impart mechanical strength to the composite catalyst. This permits the catalyst to withstand the severe conditions encountered during regeneration without suffering appreciable physical disintegration.

The composite catalyst is prepared by depositing the noble metal, with or without rhenium, on silica gel by using impregnation techniques well known in the art. When the noble metal is platinum, for example, the silica gel may be impregnated with an aqueous solution containing platinum, suitably in the form of a platinum salt or in the form of a combination of chloroplatinic acid and ethylene diamine complex solution. The solution should contain sufficient amount of the noble metal to provide the final composite catalyst with a metal content specified above. Similar techniques are used with the optional rhenium component which may conveniently be deposited simultaneously with the noble metal.

The impregnated silica gel is heated to a temperature of from about 100° to 1,000° F., suitably from 100° to 300° F., so as to accomplish at least partial drying of the impregnated material. Thereafter, the impregnated material is admixed with hydrated alumina such that the ultimate composite catalyst contains alumina in the ranges noted above.

The admixing of the impregnated silica with alumina may be accomplished, in practice, by introducing the impregnated silica into a freshly prepared precipitate of hydrated alumina, such as $\alpha$ or $\beta$-alumina hydrate. The components are milled by passing through a colloid mill to give a uniform dispersion of the impregnated silica in the alumina. The mixing in the colloid mill causes the impregnated silica aggregates to be broken down into particles having average diameters of about 0.5 to about 5 microns. By impregnating the silica with the noble metal, a more uniform dispersion of the metal component is provided than can be obtained by impregnation of a preformed silica and alumina pellet.

The composite product resulting from the admixing operation is then dried. Suitable and convenient drying temperatures are from about 130° to about 300° F., although both higher and lower temperatures may be employed. The composite is subsequently crushed and sieved, for example, through a —40 mesh sieve. Sufficient water is added to give a good extrusion mix and the composite is formed into the desired shape contemplated for use. Illustratively, the particles can be ground to provide a finely divided catalytic mass as by mulling, or may be made into the shape of beads. Preferably, the composite product is extruded.

After shaping, the composite is dried and calcined. Drying of the composite may be undertaken at ambient temperatures, or at temperatures of about 300° F. for several hours. Alternatively, ambient temperatures can be initially employed with subsequent incremental increases in temperature to about 300° F. After drying, the composite is calcined at temperatures of from about 500° to 1,100° F., preferably in a stream of dry gas and more preferably at maximum temperatures ranging from 850° to 1,000° F. Calcining of the composite converts the hydrated alumina to $\gamma$ or $\eta$-alumina, depending upon whether the initial hydrate was $\alpha$ to $\beta$. At the completion of the calcination step, the converted alumina is transformed into a strong binder. Pellets prepared by this technique possess high crush strength, whereas, silica catalysts which do not have alumina are weak and have crush strength of only a few pounds.

While not wishing to be bound by any scientific theory, it is believed that the effectiveness of the catalyst of this invention as a reforming catlyst is due to the fact that it possesses limited and weak acid sites in close proximity to the noble metal. These weak acid sites arise by virtue of the minor amounts of alumina present in the composite. The small amount of acidity is believed to be present at the interface of the silica and alumina components, which interface is believed to be composed of silica-alumina. Such limited and weak acidity is beneficial in promoting ring closure to cyclic compounds. Furthermore, the presence of a limited number of weak acid sites in close proximity to the noble metal assists in the dehydration of the cyclic compounds to aromatics. On the other hand, where large quantities of strong acid sites are present in a composite catalyst, such as when the catalyst is composed of silica alumina or when the catalyst is halogenated to form a fluorided composite, substantial hydrocracking of the fraction will occur. Such hydrocracking will, of course, reduce the recoverable amount of product boiling in the gasoline boiling range. This would defeat one of the primary objects of this invention, which is to maximize gasoline and aromatics production.

In the reforming process of this invention, the reaction conditions are those of a typical reforming operation. Thus, the general and preferred ranges of the operating conditions are shown below in Table I.

TABLE I

| Operating Condition | General Range | Preferred Range |
|---|---|---|
| Temperature, °F. | 500–1100 | 700–1000 |
| Pressure, psig | 25–900 | 50–600 |
| Gas Rate, SCFB | 500–10,000 | 1000–5000 |
| Space Velocity, Vo/H$_2$/Vc | 0.2–10.0 | 0.5–8.0 |
| Hydrogen Purity, mol % | 50–100 | 80–100 |

SPECIFIC EXAMPLES

This invention will be better understood by reference to the following specific examples, which are included here for purposes of illustration only and are not to be construed as limitations.

EXAMPLE I

Preparation of Catalyst.

The catalyst was prepared by impregnating a silica gel with 0.75 wt.% of platinum, grinding the silica gel to pass through a −40 mesh sieve and dispersing the ground silica gel in an alumina gel matrix.

867 grams of a commercially available acid leached silica gel was calcined at 500° F. for 2 hours in air and 626 grams of silica were obtained. The silica was chilled in an ice bath and impregnated with 100cc of chilled chloroplatinic acid solution - 0.05 gram of platinum per cc diluted to 800cc with distilled water. The impregnated silica was allowed to stand in the ice bath for 1 hour with frequent mixing, after which it was dried at 325° F. for 2 hours with occasional mixing and subsequently dried overnight at 300° F. The dried material was calcined in air at 900° F. for 2 hours and 620 grams were recovered. The platinum impregnated silica gel was crushed and sieved to −40 mesh.

The alumina gel was prepared by dissolving 368 grams of Al$_2$(SO$_4$)$_3$ · 18 H$_2$O in 3 liters of distilled water to which 300cc of concentrated NH$_4$OH was added to effect precipitation of hydrated alumina gel. The alumina gel was washed three times with cold water and filtered to remove most of the sulfate.

The Pt-SiO$_2$ gel (−40 mesh) was then mixed with the alumina gel and passed through a colloid mill. This material was dried on the steam plate for a sufficient amount of time to remove moisture and obtain a good extrusion mix. The dried material was crushed using a mortar and pestle and sieved to −40 mesh.

The material was then extruded in a pellet mill in the form of 1/16" pellets. The pellets were dried in air (16 hours) on the steam plate (130° F.) for 8 hours and then for 8 hours at 300° F. in an oven.

The pellets were then calcined for 2 hours at 1,000° F. starting at 500° F. and raising the temperature 100° F. per hour.

The average crush strength of 20 pellets was 7.0 pounds.

The catalyst had the following characteristics:

| | |
|---|---|
| LOI at 1,000° F./3 hours | 0.19 |
| % Pt | 0.65 |
| % Al$_2$O$_3$ | 10.2 |
| % SiO$_2$ | 79.7 |

EXAMPLE II

Comparison of the reforming activity of the catalyst of this invention and a prior art catalyst.

In this example, the catalyst prepared in Example I was evaluated in a reforming operation and compared to a prior art silica-alumina reforming catalyst. The prior art catalyst had the following characteristics:

| | |
|---|---|
| % Pt | .47 |
| % Si | .37 |
| % F | 1.02 |
| surface area | 209 m$^2$/gm |
| crush strength | 13.6 lbs. |
| density | .80 gm/cc |
| support | alumina |

The evaluations were made in a ¾ inch fixed bed reactor at 850° F., 50 psig and 6000 SCFB of hydrogen. The liquid hourly space velocity (LHSV), defined as the volume of liquid hydrocarbon charge per hour per volume of catalyst contained in the reaction zone, was 1.0. The charge stock was an Arabian light straight run naphtha.

The results of the comparison between the catalyst of this invention and the prior art catalyst in reforming the Arabian light straight run naphtha are shown in the following Table II:

TABLE II

| | Charge LSR Naphtha | Pt on SiO$_2$ in Al$_2$O$_3$ Matrix | Prior Art Catalyst |
|---|---|---|---|
| Temperature, °F. | | 850 | 850 |
| Pressure, psig | | 50 | 50 |
| LHSV, Vo/Hr/Vl | | 1.0 | 1.0 |
| Hydrogen Rate, SCFB | | 6000 | 6000 |
| C$_4$$^+$ Product Yield, wt. % | | 92.8 | 87.8 |
| Product Quality | | | |
| Go Component Analysis | | | |
| C$_3$–C$_4$'s | .6 | 6.3 | — |
| C$_5$'s | 22.6 | 26.5 | — |
| n-C$_6$ | 24.6 | 12.4 | — |
| 2-methylpentane + 3-methylpentane cyclopentane + methylcyclopentane - 2,2-dimethylpentane + | 18.2 | 24.1 | — |
| 2,3-dimethylpentane | 7.9 | 6.6 | — |
| n-Heptane | 5.2 | 0.9 | — |
| Benzene | .0 | 9.8 | — |
| Toluene | .0 | 5.7 | — |
| Other (higher paraffins) | 20.5 | 7.7 | — |
| RON clear | 65.3 | 82.8 | 80.5 |

The foregoing data indicate that the catalyst of this invention produces a high C$_4$$^+$ yield and a higher clear research octane number.

EXAMPLE III

In this example, the catalyst prepared in Example I was evaluated in a reforming operation under conditions identical to those in Example II. The charge stock was a raffinate.

The results of this reforming operation are shown in the following Table III:

TABLE III

|  | Charge Raffinate | Pt on SiO$_2$ in Al$_2$O$_3$ Matrix |
|---|---|---|
| Temperature, ° F. |  | 850 |
| Pressure, psig |  | 50 |
| LHSV, Vo/Hr/Vl |  | 1.0 |
| Hydrogen Rate, SCFB |  | 6000 |
| C$_5$+ Product Yield, wt. % |  | 89.3 |
| Product Quality |  |  |
| ASTM Ms Analysis |  |  |
| Paraffins | 80.4 | 38.8 |
| Monocycloparaffins | 7.6 | 4.3 |
| Dicycloparaffins | 0.0 | 0.0 |
| Tricycloparaffins | 0.1 | 0.6 |
| Alkyl Benzenes | 11.4 | 55.7 |
| Indanes, Tetralenes | 0.4 | 0.1 |
| Naphthalenes | 0.0 | 0.5 |
| RON, clear | 42.0 | 90.7 |

The foregoing data show that a reforming operation employing the catalyst of this invention produces a high C$_5$+ yield, and a significant rise in octane number.

EXAMPLE IV

This example illustrates the use of a silica-alumina catalyst containing platinum and alumina within the ranges prescribed for the catalysts of this invention, but not prepared in accordance with the process for preparing the catalysts of this invention.

A sample of commercially available alumina cracking catalyst, containing 13 wt.% alumina, was impregnated with 0.5 wt.% platinum and evaluated in a reforming operation using as charge stock a Lockport light straight run naphtha. The evaluation was made at 650° F., 750° F., 850° F. and 950° F., at 100 psig, 1.0 LHSV and 6000 SCFB of hydrogen. The charge stock had a clear research octane number of 69. The results of this evaluation are shown in the following Table IV:

TABLE IV

| PERIOD | A | B | C | D | E | F | G | H | I | J | K | L |
|---|---|---|---|---|---|---|---|---|---|---|---|---|
| HOURS-ON-STREAM | 0–6 | 7–12 | 13–18 | 19–24 | 25–30 | 31–36 | 37–42 | 43–48 | 49–54 | 55–60 | 61–66 | 67–72 |
| TEMPERATURE, ° F. | 651 | 649 | 649 | 750 | 750 | 750 | 848 | 849 | 849 | 951 | 950 | 950 |
| LHSV, V/HR/V | 1.00 | 0.91 | 0.88 | 1.00 | 0.98 | 0.93 | 0.91 | 1.00 | 1.00 | 0.86 | 1.22 | 1.00 |
| FEED WEIGHT, GM. | 420 | 380 | 370 | 420 | 410 | 390 | 380 | 420 | 420 | 360 | 510 | 420 |
| FEED VOLUME, CC | 602 | 545 | 530 | 602 | 588 | 559 | 545 | 602 | 602 | 516 | 731 | 602 |
| HYDROGEN RATE, SCF/BBL | 6,496 | 6,999 | 7,198 | 6,812 | 6,488 | 6,255 | 7,174 | 6,496 | 6,496 | 7,578 | 5,349 | 6,496 |
| OG + PG VOLUME AT 32° F., FT3 | 29.38 | 27.54 | 28.75 | 29.72 | 28.99 | 27.58 | 29.51 | 29.70 | 25.27 | 30.87 | 29.43 | 29.43 |
| TOTAL LIQUID PRODUCT: WEIGHT, GMS | 299 | 304 | 185 | 303 | 289 | 285 | 253 | 300 | 306 | 260 | 358 | 281 |
| YIELD, WT. % (BASIS LIQ. CHARGE) | 71.2 | 80.0 | 50.0 | 72.1 | 70.5 | 73.0 | 66.6 | 71.4 | 72.8 | 72.2 | 70.2 | 66.9 |
| TOTAL PRODUCT ANALYSIS: RON, CLEAR | 69.2 | 69.8 | 67.3 | 69.8 | 69.8 | 68.0 | 77.6 | 76.2 | 75.5 | 73.8 | 72.4 | 71.0 |

The foregoing data show that the use of this low alumina catalyst achieves only a meager upgrading of the octane number, to a maximum of only 77.6. This should be contrasted to the considerably larger improvements in octane number achieved by the use of the catalyst prepared according to the method of Example I. It should noted that both catalysts contain essentially the same amount of platinum, silica and alumina.

What is claimed is:

1. A process for increasing the octane number of a paraffin-containing gasoline blending component which process comprises contacting said blending component under reforming conditions of about 500° to 1100° F. and 25 to 900 p.s.i.g. with hydrogen in the presence of a composite catalyst prepared by depositing a noble metal on silica and dispersing the resulting impregnated silica in a matrix consisting essentially of alumina, where said catalyst comprises from about 0.01 to 1.0 wt. % of noble metal, from about 5 to about 30 wt. % of alumina and the remainder silica.

2. A process according to claim 1 in which the catalyst comprises from about 0.02 to 0.7 wt.% of noble metal and from about 5 to 15 wt.% of alumina.

3. A process according to claim 1 in which the noble metal is platinum.

4. A process according to claim 1 in which the noble metal is palladium.

5. A process according to claim 1 in which the catalyst is prepared by additionally depositing on the silica rhenium in an amount of up to 1.0 wt.% based on the total weight of the catalyst.

6. In a process for preparing a hydrocarbon conversion catalyst having from about 0.01 to 1.0 wt. % of a noble metal, from about 5 to about 30 wt. % of alumina and the remainder silica, the improvement which comprises impregnating a silica gel with a solution of a noble metal, at least partially drying said impregnated silica gel, admixing the impregnated silica gel with hydrated alumina thereby forming a composite composed of a noble metal on silica in a matrix consisting essentially of alumina, and drying and calcining said composite.

7. A process according to claim 6 in which the silica gel is also impregnated with a solution of rhenium.

8. A process according to claim 6 in which the noble metal is platinum.

9. A process according to claim 6 in which the noble metal is palladium.

10. A process for preparing a hydrocarbon conversion catalyst which comprises impregnating a silica gel with a solution of a noble metal, drying the impregnated silica gel, crushing said impregnated silica gel to obtain particles having average diameters of from about 0.5 to 5.0 microns, admixing the impregnated silica gel particles with an alumina gel matrix to obtain a composite comprising a noble metal impregnated silica dispersed in a matrix consisting essentially of alumina, said composite having from about 0.01 to 1.0 wt. % of a noble metal, from about 5 to about 30 wt. % of alumina and the remainder silica, and drying and calcining said composite.

11. A process according to claim 10 in which the silica gel is impregnated additionally with a solution of rhenium.

12. A process according to claim 10 in which the noble metal is platinum.

13. A process according to claim 12 in which the silica gel is impregnated with a solution of a platinum salt.

14. A process according to claim 12 in which the silica gel is impregnated with a solution of chloroplatinic acid.

15. A process according to claim 10 in which the noble metal is palladium.

16. A process according to claim 10 in which the alumina in the composite is γ-alumina.

17. A hydrocarbon conversion catalyst comprising a composite composed of a noble metal impreganted silica dispersed in a matrix consisting essentially of alumina, said composite having from about 0.01 to about 1.0 wt. % of a noble metal, from about 5 to 30 wt. % of alumina and the remainder silica.

18. A catalyst according to claim 17 in which the noble metal is platinum.

19. A catalyst according to claim 17 in which the noble metal is palladium.

20. A catalyst according to claim 17 which comprises additionally rhenium on said silica.

21. A catalyst according to claim 17 which comprises from about 0.02 to about 0.7 wt. % of noble metal and from about 5 to 15 wt. % of alumina.

22. A catalyst according to claim 20 in which the rhenium is present in an amount up to 1.0 wt.%.

* * * * *